(No Model.)
G. SABOTKA, J. BLUMER & W. M. DAVIS.
PROCESS OF PREPARING MASHES IN BEER MAKING.
No. 386,268. Patented July 17, 1888.
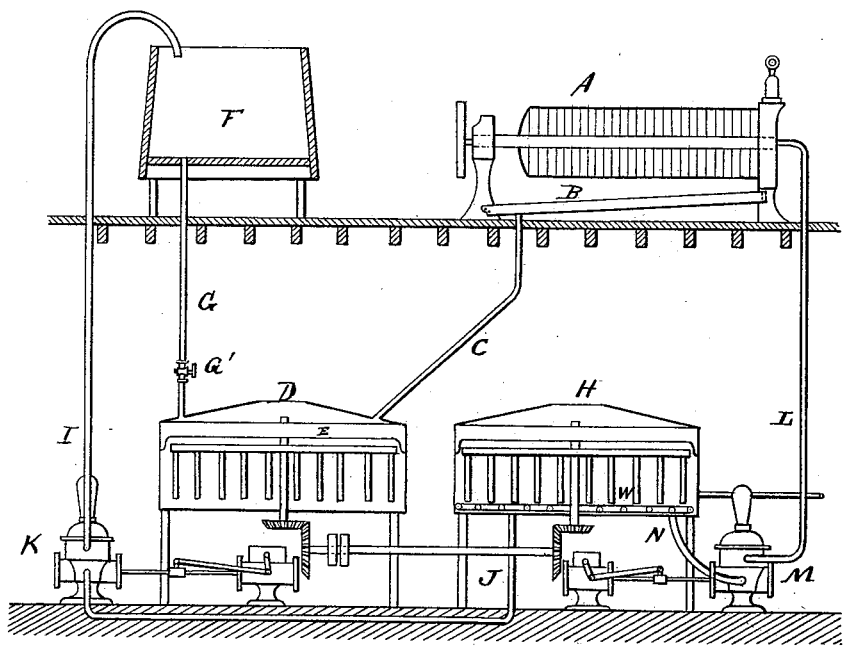
WITNESSES:
INVENTORS

UNITED STATES PATENT OFFICE.

GUSTAV SABOTKA AND JACOB BLUMER, OF BROOKLYN, AND WILLIAM M. DAVIS, OF LONG ISLAND CITY, NEW YORK.

PROCESS OF PREPARING MASHES IN BEER-MAKING.

SPECIFICATION forming part of Letters Patent No. 386,268, dated July 17, 1888.

Application filed April 13, 1887. Serial No. 234,571. (No specimens.)

*To all whom it may concern:*

Be it known that we, GUSTAV SABOTKA and JACOB BLUMER, of Brooklyn, county of Kings, State of New York, and WILLIAM M. DAVIS, of Long Island City, Queens county, State of New York, have invented certain new and useful Improvements in Processes of and Apparatus for Mashing Grain, of which the following is a specification.

The object of our invention is to provide a new and improved process of mashing grain, whereby less malt is used and the conversion of starch into sugar takes place in a shorter time.

The invention consists, essentially, in first preparing an infusion of malt at ordinary temperature, separating it by filtering, and using this infusion with the residual malt in mashing unmalted grain.

In the accompanying drawing a cross-sectional view of the apparatus used in carrying out our improved process is shown.

A represents the filtering-press; B, the collecting-trough below the same, from which the pipe C leads from the mash-tub D, containing an agitator, E, of any well-known construction. Above the mash-tub D a tub or tank, F, is provided, connected by the pipe G, having the cock G', with the mash-tub D.

H is a mash-tub, which is connected by the pipe J with the pump K, from which the pipe I extends upward to the tank or tub F. The pipe L connects the filtering-press with the pump M, which in turn is connected by the pipe N with the bottom of the mash-tub H. Coil-pipes W or other suitable heating devices may be used for heating the corn-mash in the mash-tub H.

The proper quantity of ground malt (corn-malt being preferred, as it is the cheapest) is mixed with the proper quantity of water at ordinary temperature and placed into the mash-tub H and agitated in the same, so as to obtain as great a quantity as possible of infusion of malt, and when this is accomplished the entire contents of the tub H are pumped, by means of the pump M, through the pipes N and L to the filter-press A, which separates the infusion from the malt. It is very essential to use a filter-press, as by means of the same a better separation of the solution from the malt is obtained without waste and a comparatively small quantity of the malt is required to produce the mash. The infusion of malt is run from the trough B through the pipe C into the mash-tub D, and the dry cakes or residual malt are taken from the press and placed into the mash-tub H and mixed with a certain quantity of cornmeal and water, the mixture being heated by steam to about 78° Reaumur and agitated at the same time. The residual malt, which still contains some active parts which were not extracted by the infusion, will thoroughly mix with the corn-mash and liquefy it to such an extent that it can easily be pumped from the tub H through the pipes J and I into the tub F. During the time that the corn-mash is being pumped into the tub F the ryemeal is mashed in the tub D with the infusion of malt that was conveyed from the filter-press into the tub D through the pipe C. After the ryemeal and infusion of malt have been thoroughly mixed the very hot corn-mash in the tub F is permitted to flow into the rye-mash for the purpose of bringing the rye-mash to the proper temperature.

The flow of the hot corn-mash can be regulated by means of the cock G' in the pipe G. When the mash is finished, it is cooled and set with yeast in the usual manner.

Having thus described our invention, we claim as new and desire to secure by Letters Patent—

The herein-described process of mashing malt and unmalted grain, consisting in mixing the ground malt with water at an ordinary temperature to obtain an infusion of malt, separating said infusion from the malt by filtering, mixing the residual malt with cornmeal and water and heating it nearly to the boiling temperature, mixing the infusion of malt with ryemeal at ordinary temperature, and adding the hot corn-mash to said ryemeal, and then allowing the mash obtained to cool for treatment, substantially as described.

In testimony that we claim the foregoing as our invention we have signed our names in presence of two subscribing witnesses.

GUSTAV SABOTKA.
JACOB BLUMER.
WILLIAM M. DAVIS.

Witnesses:
OSCAR F. GUNZ,
MARTIN PETRY.